Patented Apr. 28, 1931

1,803,098

UNITED STATES PATENT OFFICE

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY

TERNARY COMPOSITION OF MATTER

No Drawing. Application filed October 9, 1926. Serial No. 140,688.

The present invention relates to novel compositions of matter particularly adapted for use as working substances in producing heat transforming effects, as in artificial or mechanically operated refrigerating systems.

Heretofore it has been known to add to a volatile liquid, such as a halogenated hydrocarbon, some substance, such as alcohol, which will combine with water when the latter is present in the volatile liquid as an impurity. It is also known to add to a volatile liquid, such as a halogenated hydrocarbon, a lubricant of low cold viscosity (low cold test), which however is not intended to separate from the volatile liquid even at the lowest temperature obtaining in a refrigerating system.

In my copending application, Serial No. 60,311, filed October 3, 1925, I have disclosed binary compositions of matter comprising a volatile liquid, as a halogenated hydrocarbon, and a lubricant miscible therewith, such that separation of the two components does take place on the low side of a refrigerating system operating after the process disclosed in my copending application, Serial No. 85,580, filed February 2, 1926, this separation being wholly a concentration phenomenon and permitting the novel effect that each component of the fluid composition is enabled to perform its separate function.

One object of the present invention is to provide compositions of matter having abnormal combinations of physical and chemical properties including high viscosity, volatility, and chemical stability. Another object is to develop improved forms of lubricating working substances for producing heat transforming effects. Other objects will be apparent from the detailed description which follows.

My previously disclosed fluid compositions above referred to comprising a volatile halogenated hydrocarbon and an oily viscous hydrocarbon soluble therein in certain temperature-pressure ranges possess the abnormal characteristic of having both lubricating and refrigerating properties, and the vapor tension of the volatile ingredient is not seriously reduced when the oily ingredient is of the proper viscosity and vapor tension. The present invention is designed to improve thereon by making use of a new and added principle involving the combination with the two types of components before disclosed, of a third type of ingredient, differing from both.

It is a well known principle in physical chemistry that given a solution of two miscible liquids to which a third liquid miscible with but one of the first two is added, an emulsoid is generally formed with the result that the less miscible component is partially displaced from solution and remains present as a suspensoid in the form of minute globules. The addition of such a third ingredient may result in profound changes in the vapor tension, surface tension, viscosity, and other properties of the mixture.

In the present invention, I make use of the above principle to improve my previous fluid composition consisting of a mixture of a volatile liquid and a lubricant by adding a small quantity of a liquid which, while completely miscible and soluble in the former or volatile component, is wholly insoluble in the lubricant. For example, by adding a small percentage of an alcohol to a mixture of a volatile hydrocarbon and a non-volatile hydrocarbon, part of the non-volatile hydrocarbon, or lubricant, is displaced as minute globules and, at the same time, the composite vapor tension or total vapor pressure of the composition is raised by the freeing of part of the volatile hydrocarbon from its solution with the non-volatile hydrocarbon. This is of great importance in a heat transforming system of the closed cycle type such as disclosed in my copending application, Serial No. 85,580, referred to above, since some of the non-volatile ingredient or lubricant is always present in its original viscosity and is therefore available for lubrication. Still further improvement in working substances for such systems results when the new or third ingredient is so chosen as to combine with any water present as an impurity. The alcohols are eminently suitable from this standpoint.

Investigation and experimentation have disclosed that a wide range of ingredients are available to form a ternary composition of matter having the desirable properties above referred to in any desired proportion so as to be adaptable to produce varied heat transforming effects. While other volatile liquids may be used, it is preferable to confine the same to halogenated hydrocarbons of which the following are listed as typical examples:

Ethyl chloride, $C_2H_5Cl$; Methylene chloride, $CH_2Cl_2$; ethylene chloride, $C_2H_4Cl_2$; chloroform, $CHCl_3$; dichloroethylene, $C_2H_2Cl_2$; carbon tetrachloride, $CCl_4$; ethyl bromide, $C_2H_5Br$.

For the non-volatile component any oily or viscous substance miscible with the members of the volatile group and non-miscible with the liquids selected for the third component may be chosen. Any hydrocarbon oil is suitable and this includes any commercial lubricant provided it is pure hydrocarbon.

Confining the volatile component to the halogenated hydrocarbons, and the non-volatile component to hydrocarbon lubricants, the third component of the tenary composition may be any one of the following alcohol group:

Methyl alcohol, $CH_3OH$; butyl alcohol, $CH_3(CH_2)_2CH_2OH$; ethyl alcohol, $C_2H_5OH$; propyl alcohol, $CH_3(CH_2)_2OH$.

In combining the ingredients to form the tenary composition of matter of the present invention the chosen halogenated hydrocarbon predominates with a small percentage of hydrocarbon lubricant and a still smaller percentage of alcohol. The volatile component may range from 70 to 90%, the non-volatile component or lubricant from 8 to 25% and the third component or alcohol from 2 to 10%. One composition which has been found to give particularly satisfactory results comprises 70 to 90% of methylene chloride, 8 to 25% of hydrocarbon lubricant, and 2 to 10% of methyl alcohol.

I claim as my invention:

1. The use as a working substance for refrigerating systems of a composition of matter comprising methylene chloride, a hydrocarbon lubricant, and methyl alcohol.

2. A composition of matter comprising 70 to 90 per cent of methylene chloride, 8 to 25 per cent of lubricant miscible with said methylene chloride, and 2 to 10 per cent of methyl alcohol.

Signed by me at Detroit, in the county of Wayne and State of Michigan, this 4th day of October, 1926.

RANSOM W. DAVENPORT.